Inventor:
Howard J. Murphy.
By: Williams, Bradbury,
McColeb & Hinkle
Attorneys.

Patented June 2, 1931

1,807,928

UNITED STATES PATENT OFFICE

HOWARD J. MURPHY, OF READING, MASSACHUSETTS, ASSIGNOR, BY MESNE ASSIGNMENTS, TO ALEMITE CORPORATION, OF CHICAGO, ILLINOIS, A CORPORATION OF DELAWARE

CHARGE DETERMINING DEVICE

Original application filed January 9, 1926, Serial No. 80,244. Divided and this application filed November 25, 1927. Serial No. 235,492.

This invention aims to provide means in lubricating apparatus, and is more particularly concerned with the charge determining devices of so-called centralized systems. Centralized lubricating systems comprise in general a lubricant reservoir or other source of lubricant supply, a pump supplied from said reservoir, a conduit or conduits leading from the pump to the bearings to be lubricated, and a charge determining device adjacent each bearing for regulating the quantity of lubricant supplied thereto by the pump.

In the drawings which illustrate a preferred embodiment of my invention,

Figure 1:
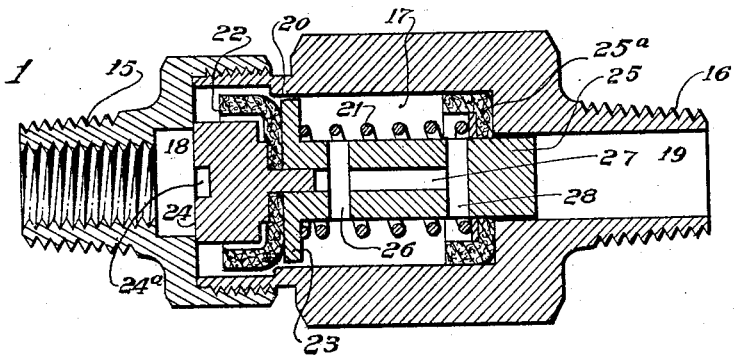
Figure 1 is a sectional view of my new and improved charge determining device showing the normal position of the expelling means when the pump is at rest.

Referring to the drawings, I have shown a charge determining device having an end 15 adapted to be connected to a lubricant conduit leading from the pump of the centralized lubricating system, and having an outlet end 16 adapted to be connected to the bearing to be lubricated. Each charge determining device includes a charge determining chamber 17 having an enlarged bore at the inlet end of the device. Inlet 18 and outlet 19 are provided at opposite ends of the chamber, while a piston 20 is located within the chamber and normally urged toward the inlet passage by a spring 21.

The piston comprises a cup shaped washer 22 back-supported by a metal disc portion 23 and secured in place by a part 24. Integral with the disc portion 23 is a piston stem 25 which is surrounded by a flexible washer 25a held at the outlet end of the chamber by a spring 21. The stem is bored at 26, 27 and 28 to provide a by-pass for passage of lubricant from the chamber 17.

Figure 2:
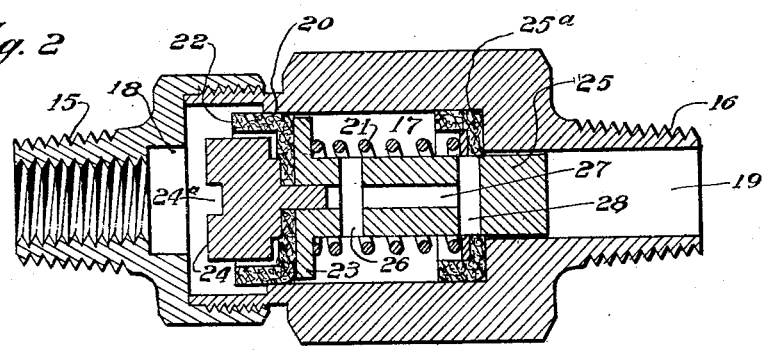
Figure 2 is a view similar to Figure 1, but showing the expelling means in an intermediate position.

When it is desired to lubricate the bearings to which my new and improved charge determining device is connected, the pump in the centralized lubricating system is operated to force lubricant through the conduits to the charge determining device into which the lubricant passes through the slot 24a in the part 24, and then around the piston 20 in the device, as shown in Figure 1, thereby filling the chamber 17 of the device. The by-pass in the piston stem 25 is closed, while the chamber 17 is being filled with lubricant, thereby to prevent direct passage of lubricant from the chamber 17 to the parts to be lubricated. After the chamber is filled, the pressure of the lubricant acts upon the piston 20 to force it into the smaller part of the chamber 17, thereby cutting off the flow of lubricant to the chamber, as shown by Figure 2. It should be noted that the by-pass in the piston stem 25 is still closed and remains so until the piston 20 is moved slightly beyond closing position, thereby insuring against possibility of direct passage of lubricant from the pipe system to the parts to be lubricated.

Figure 3:
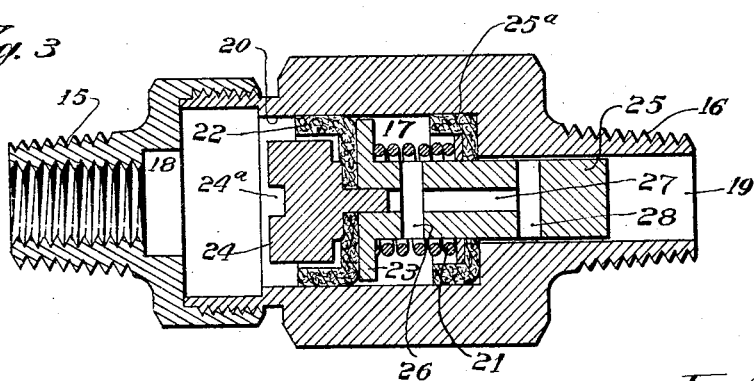
Figure 3 is a view similar to Figure 1, but showing the expelling means in full discharge position.

During the travel of the piston between closing the opening into the chamber 17 and opening the by-pass in the piston stem 25, the lubricant may leak past the cup washer 22 from the chamber to permit movement of the piston after the inlet to the chamber 17 is closed. From the instant the bore 28 passes the flexible washer 25a until the end of the stroke of the piston, the lubricant passes from the chamber 17 through the bores 26, 27 and 28 into the outlet passage 19, as shown in Figure 3. The quantity of the lubricant depends upon the stroke and the cross-sectional area of the chamber 17 minus the cross-sectional area of the piston stem 25. Therefore, by changing the dimensions of any one or all of these elements, the quantity may be varied to suit the requirements of each bearing.

When the lubricant pump ceases to operate, pressure in the system is relieved, the pressure on the piston 20 in the charge determining device is likewise relieved, thereby permitting the spring 21 to force the piston back to its normal position, where the lubricant may again fill the cup and the operation may be repeated.

This application is a division of my co-pending application, Serial No. 80,244, filed January 9, 1926, for Lubricating apparatus.

While I have shown and described a preferred embodiment of my invention, it should be understood that changes involving omission, substitution, alteration and reversal of parts, and even changes in the mode of operation may be readily made, without departing from the scope of my invention, which is best defined in the appended claims.

I claim:

1. A charge determining lubricant device comprising a lubricant chamber, an inlet therefor, an outlet for said chamber, means movable in said chamber and normally closing said outlet and permitting lubricant to flow into said chamber from said inlet, said means movable first to prevent inflow of lubricant and second to open said outlet, said means having an appreciable movement between closing said inlet and opening said outlet.

2. A charge determining lubricant expelling device comprising a lubricant measuring chamber, a normally opened inlet therefor, a normally closed outlet to said chamber, piston means movable in said chamber for controlling communication through said inlet and said outlet, said means closing said inlet against inflow of lubricant prior to opening said outlet, and means associated with said piston means for permitting back flow of lubricant through said inlet after closing of said inlet to inflow of lubricant.

3. A lubricating device comprising, in combination, a lubricant chamber, a piston normally located so as to permit lubricant to pass around said piston into said chamber, and by-pass means from said chamber to a part to be lubricated normally closed to prevent passage of lubricant from said chamber to the part to be lubricated until after said piston has closed the passage between the lubricant supply and said chamber.

4. A charge determining lubricant expelling device comprising a lubricant measuring chamber, a piston reciprocable in said chamber and normally located at the inlet end of the chamber, a space between the piston in its normal position and the wall of the chamber thereby to permit passage of lubricant around said piston to fill said chamber, and by-pass means carried by said piston to open said chamber to communication with the part to be lubricated subsequent to moving said piston to cut off the supply of lubricant to said chamber.

5. A charge determining lubricant expelling device comprising a lubricant measuring chamber, a piston reciprocable in said chamber and normally located at the inlet end of the chamber, a space between the piston in its normal position and the wall of the chamber thereby to permit passage of lubricant around said piston to fill said chamber, and by-pass means carried by said piston to open said chamber to communication with the part to be lubricated subsequent to moving said piston to cut off the supply of lubricant to said chamber, said piston having a cup washer facing toward the inlet end of said device to permit escape of lubricant from said chamber between the time when said piston closes the chamber and when the by-pass opens to permit lubricant to pass from said chamber to the part to be lubricated.

6. A charge determining lubricant cup comprising a lubricant measuring chamber enlarged at its inlet end, a spring-pressed piston normally urged into said enlarged portion of said chamber to provide a space around said piston for passage of lubricant, a piston stem carried by said piston and surrounded by a washer at the discharge end of said chamber to prevent leakage around said stem and cooperating bores in said stem providing normally closed by-pass means between said chamber and an outlet passage beyond said washer.

7. A charge determining lubricant cup comprising a lubricant measuring chamber enlarged at its inlet end, a spring-pressed piston normally urged into said enlarged portion of said chamber to provide a space around said piston for passage of lubricant, a piston stem carried by said piston and surrounded by a washer at the discharge end of said chamber to prevent leakage around said stem and cooperating bores in said stem providing normally closed by-pass means between said chamber and an outlet passage beyond said washer, said by-pass being opened by the forward movement of said piston and piston stem, said piston having a cup washer facing toward the inlet passage of said device to permit such passage of lubricant from said chamber as is necessary to open the by-pass out of said chamber while preventing passage of lubricant into said chamber during operation of said piston.

8. In a measuring valve for lubricating apparatus of the class described, the combination of a measuring chamber, a chamber of larger cross-section at one end thereof and from which said measuring chamber is supplied with lubricant, an inlet for said larger chamber, a valve for cutting off inflow of lubricant to said measuring chamber, a spring normally holding said valve in said larger chamber, an outlet for said measuring chamber, and a discharge valve normally closing said outlet openable only after said first-named valve has moved an appreciable distance lengthwise of said measuring chamber after cutting off inflow of lubricant thereto.

9. In a measuring valve for lubricating apparatus of the class described, the combination of a measuring chamber, a chamber of larger cross-section at one end thereof and from which said measuring chamber is supplied with lubricant, an inlet for said larger chamber, a valve for cutting off inflow of lubricant to said measuring chamber, spring means normally holding said valve in said larger chamber and adjacent said inlet, an outlet for said measuring chamber providing a tubular valve seat, and a discharge valve having a tubular valve face terminating at a point normally remote from the outlet end of said tubular valve seat whereby said discharge valve is opened only upon a predetermined movement of said first-named valve after said first-named valve is moved into said measuring chamber to cut off further flow of lubricant thereinto.

In witness whereof, I hereunto subscribe my name this 14th day of November, 1927.

HOWARD J. MURPHY.